United States Patent
Harvey

(10) Patent No.: US 11,785,054 B2
(45) Date of Patent: *Oct. 10, 2023

(54) DERIVING SYSTEM ARCHITECTURE FROM SECURITY GROUP RELATIONSHIPS

(71) Applicant: Amazon Technologies, Inc., Seattle, WA (US)

(72) Inventor: Elaine Harvey, Oakton, VA (US)

(73) Assignee: Amazon Technologies, Inc., Seattle, WA (US)

( * ) Notice: Subject to any disclaimer, the term of this patent is extended or adjusted under 35 U.S.C. 154(b) by 427 days.

This patent is subject to a terminal disclaimer.

(21) Appl. No.: 16/850,410

(22) Filed: Apr. 16, 2020

(65) Prior Publication Data

US 2020/0244708 A1    Jul. 30, 2020

Related U.S. Application Data

(63) Continuation of application No. 15/833,763, filed on Dec. 6, 2017, now Pat. No. 10,652,283.

(51) Int. Cl.
*H04L 9/40* (2022.01)
*G06F 9/455* (2018.01)

(52) U.S. Cl.
CPC ........ *H04L 63/205* (2013.01); *G06F 9/45558* (2013.01); *G06F 2009/45587* (2013.01); *G06F 2009/45591* (2013.01); *G06F 2009/45595* (2013.01)

(58) Field of Classification Search
CPC ............... H04L 63/205; G06F 9/45558; G06F 2009/45587; G06F 2009/45591; G06F 2009/45595; G06F 2009/4557
See application file for complete search history.

(56) References Cited

U.S. PATENT DOCUMENTS

| | | | |
|---|---|---|---|
| 8,078,713 B1 | 12/2011 | Kim | |
| 9,594,579 B2* | 3/2017 | Shiva | G06F 9/45533 |
| 9,766,919 B2* | 9/2017 | Gaurav | G06F 8/60 |
| 9,965,309 B2* | 5/2018 | Fine | G06F 9/45558 |
| 10,303,879 B1 | 5/2019 | Potlapally et al. | |
| 2007/0174896 A1 | 7/2007 | Furuya et al. | |
| 2008/0235757 A1 | 9/2008 | Li | |
| 2010/0333089 A1* | 12/2010 | Talwar | G06F 11/301 718/1 |
| 2013/0014107 A1* | 1/2013 | Kirchhofer | G06F 9/5083 718/1 |

(Continued)

OTHER PUBLICATIONS

Notice of Allowance for U.S. Appl. No. 15/833,763, dated Jan. 6, 2020, 21 pages.

*Primary Examiner* — Trang T Doan
(74) *Attorney, Agent, or Firm* — NICHOLSON DE VOS WEBSTER & ELLIOTT LLP

(57) ABSTRACT

Techniques for deriving system architecture from security group relationships are described. One or more security group rules can be obtained for an application, the one or more security group rules controlling communication of one or more security groups. The one or more security group rules can be analyzed to determine placement data for the one or more security groups. The placement data can be provided to a placement service, and the placement service can be caused to deploy at least one virtual machine using the placement data.

18 Claims, 7 Drawing Sheets

(56) References Cited

U.S. PATENT DOCUMENTS

| | | | |
|---|---|---|---|
| 2013/0263120 A1* | 10/2013 | Patil | G06F 9/45558 |
| | | | 718/1 |
| 2014/0019961 A1* | 1/2014 | Neuse | G06F 9/5077 |
| | | | 718/1 |
| 2014/0149493 A1* | 5/2014 | Acer | H04L 67/1023 |
| | | | 709/203 |
| 2014/0282855 A1 | 9/2014 | Clark et al. | |
| 2014/0359213 A1* | 12/2014 | Messec | G06F 9/45558 |
| | | | 711/114 |
| 2015/0092222 A1 | 4/2015 | Yasukawa et al. | |
| 2015/0256586 A1* | 9/2015 | Bragstad | H04L 65/80 |
| | | | 709/219 |
| 2016/0043968 A1* | 2/2016 | Jacob | H04L 47/827 |
| | | | 709/226 |
| 2016/0316003 A1* | 10/2016 | Snider | G06F 9/45558 |
| 2016/0378518 A1* | 12/2016 | Antony | G06F 9/5077 |
| | | | 718/1 |
| 2017/0054759 A1 | 2/2017 | Lee et al. | |
| 2017/0064749 A1* | 3/2017 | Jain | H04L 63/20 |
| 2017/0097845 A1* | 4/2017 | Kouznetsov | G06F 9/5033 |
| 2017/0199910 A1* | 7/2017 | Konik | G06F 9/45558 |
| 2017/0222977 A1 | 8/2017 | Newell et al. | |
| 2017/0230334 A1 | 8/2017 | Newell | |
| 2017/0257424 A1* | 9/2017 | Neogi | H04L 47/781 |
| 2018/0136958 A1* | 5/2018 | Nagpal | G06F 9/45558 |
| 2018/0332138 A1* | 11/2018 | Liu | H04L 41/5041 |
| 2019/0253523 A1* | 8/2019 | Raduchel | H04L 67/306 |

* cited by examiner

| INCOMING RULES 404 | | |
|---|---|---|
| PROTOCOL TYPE 408 | PORT RANGE 410 | SOURCE ADDRESS 412 |
| TCP | 22 | 203.0.113.1/32 |
| TCP | 80 | 0.0.0.0/0 |
| TCP | 1433 | STORAGE TIER IDENTIFIER |

| OUTGOING RULES 406 | | |
|---|---|---|
| PROTOCOL TYPE 408 | PORT RANGE 410 | DESTINATION ADDRESS 414 |
| ALL | ALL | 0.0.0.0/0 |
| ALL | ALL | STORAGE TIER IDENTIFIER |

SECURITY GROUP RULES 402

*FIG. 4*

DERIVING SYSTEM ARCHITECTURE FROM SECURITY GROUP RELATIONSHIPS

CROSS-REFERENCE TO RELATED APPLICATIONS

This application is a continuation of U.S. patent application Ser. No. 15/833,763, filed Dec. 6, 2017 (now U.S. Pat. No. 10,652,283, issued May 12, 2020), which is hereby incorporated by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF DRAWINGS

Various embodiments in accordance with the present disclosure will be described with reference to the drawings, in which:

FIG. 4 is an example of security group rules according to some embodiments.

DETAILED DESCRIPTION

Various embodiments of methods, apparatus, systems, and non-transitory computer-readable storage media for deriving system architecture from security group relationships are described. One or more security group rules can be obtained for an application, the one or more security group rules controlling communication of one or more security groups. The one or more security group rules can be analyzed to determine placement data for the one or more security groups. The placement data can be provided to a placement service, and the placement service can be caused to deploy at least one virtual machine using the placement data.

Applications and systems built by customers are typically separated into tiers. For example, a web application may have a load balancing layer, a front-end/web server layer, a caching layer, a storage layer, etc. For security purposes, hardware virtualization services enable users to define security settings (e.g., virtual local area networks (VLANs), firewall rules, security groups, etc.) for each of the tiers that control how each tier can communicate with other tiers, networks, the internet, etc. In some embodiments, a security group may be a set of firewall rules, in application to a VLAN or just a set of IP addresses. While the security settings for each tier are available to the hardware virtualization service to enforce, the intended type of tier is unknown to the hardware virtualization service. In various embodiments, the security settings can be analyzed to infer the user's system architecture. The inferred system architecture can be used to change or suggest changes to the user's architecture and/or security settings (e.g., to improve security or performance of the user's application). For example, the inferred architecture can be used to determine a better placement of the user's system across physical resources in the hardware virtualization environment. For example, a tier may have a spread requirement which defines how many virtual machines belonging to that tier can be placed on the same physical host or rack or share the same switch or router (e.g., to improve proximity of the tiers or to improve the spread of virtual machines in a given tier). In some embodiments, the security settings and the inferred architecture can be compared to security best practices to provide security recommendations and/or to automatically change the security settings based on the inferred architecture.

Figure 1:
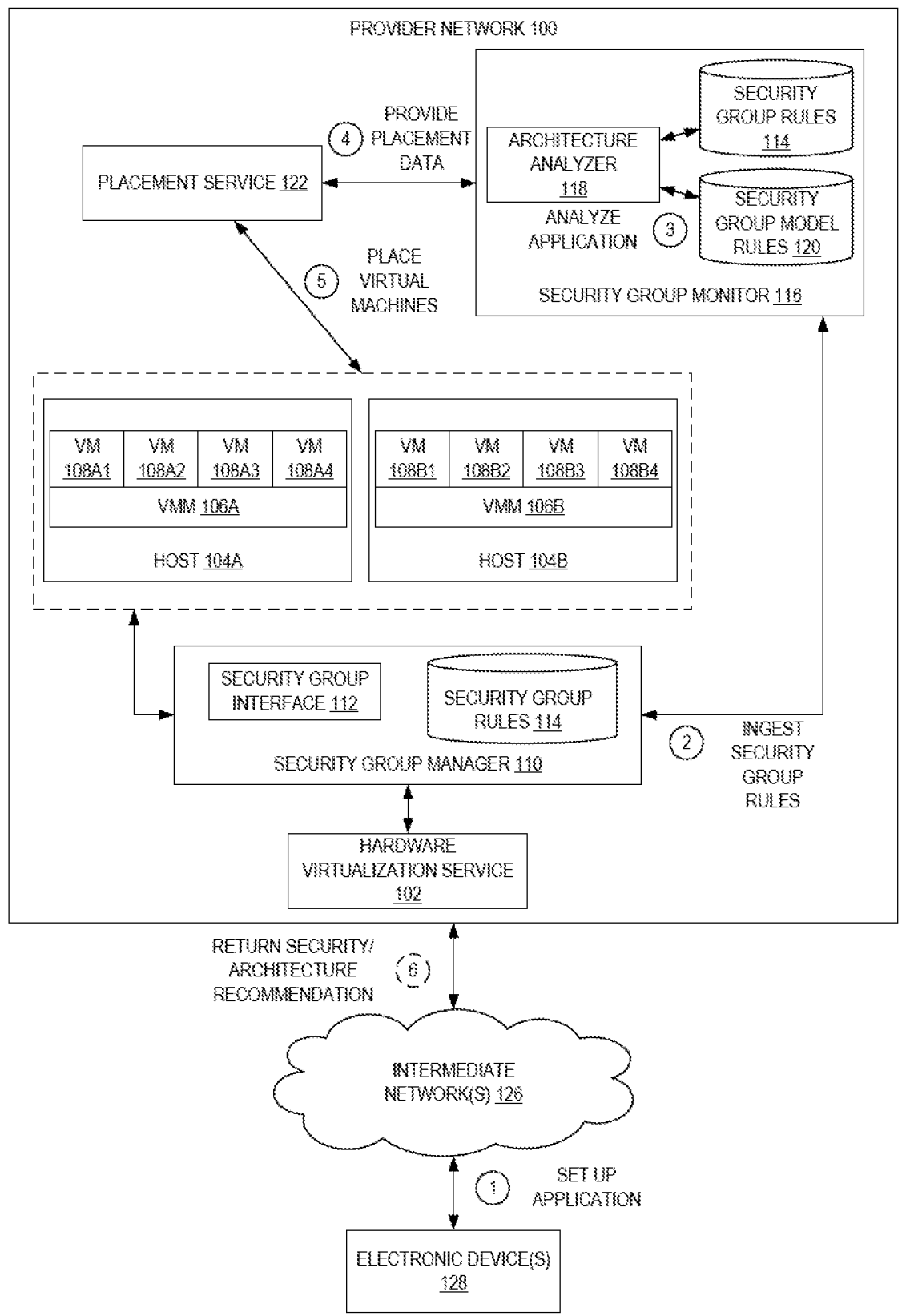
FIG. 1 is a diagram illustrating an environment for deriving system architecture from security group relationships according to some embodiments.

FIG. 1 is a diagram illustrating an environment for deriving system architecture from security group relationships according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 126 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers. The users may access the provider network using one or more electronic devices 128 connected to the intermediate networks 126. The one or more electronic devices may include computing devices such as desktop, laptop, or mobile computing devices, servers, virtual machines, or other devices.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Provider network 100 may include hardware virtualization technology that enables multiple operating systems to run concurrently on a host computer (e.g., hosts 104A and 104B), i.e. as virtual machines (VMs) 108 on the hosts 104. The VMs 108 may, for example, be executed in virtualization guest locations on the hosts 104 that are rented or leased to customers of a network provider. A hypervisor, or virtual machine monitor (VMM) 106, on a host 104 presents the VMs 108 on the host with a virtual platform and monitors the execution of the VMs 108. Each VM 108 may be provided with one or more local IP addresses; the VMM 106 on a host 104 may be aware of the local IP addresses of the VMs 108 on the host. The provider network 100 may, for example, provide customers the ability to implement virtual computing systems (VMs 108) via a hardware virtualization service 102.

As shown in FIG. 1, the user (e.g. operating electronic device 128) can send a request to hardware virtualization service 102 to setup an application or system, as shown as numeral 1. During setup, the user can define security settings (e.g., one or more security groups) which may be enforced by a VMM or hypervisor. In some embodiments, the user can define the security settings through hardware virtualization service 102 or directly through security group manager 110 (e.g., through a security group user interface 112). As discussed, the security settings may include security group rules 114 which may be enforced by VMMs 106 to control communication for each security group. The security settings may be different for each tier. For example, a storage tier may have different settings than a routing tier or a loading balancing tier.

As shown at numeral 2, a security group monitor 116 can receive the security group rules from security group manager 110. Security group monitor 116 can analyze the security group rules to infer the application architecture based on the security group rules. As noted, different types of tiers may have different rules. Additionally, different types of tiers may require different spreads (e.g., how many virtual machines belonging to that tier can be placed within the same fault container, such as on the same physical host, in the same server rack, in the same datacenter, etc.) of virtual machines across physical infrastructure to ensure performance and improve availability of the application. Although embodiments are discussed herein with respect to spreading virtual machines belonging to the same security group across multiple host machines, in various embodiments similar techniques may be used to spread virtual machines across any fault container. By spreading virtual machines across multiple hosts, the chance of coordinated failure (e.g., where loss of a single host prevents the application from functioning) is reduced. For example, if virtual machines 108A run all of the virtual machines of a front end tier of an application, the loss of host 104A prevents access to the application. However, if the virtual machines are spread across hosts 104A and 104B, the loss of any single host does not prevent access to the application. different tier types may be associated with different spread requirements.

As shown at numeral 3, an architecture analyzer 118 can compare the security group rules 114 defined by the user to security group model rules 120. The security group model rules may include security settings that are common to different tier types (e.g., represent security settings best practices for each tier). For example, security settings for a SQLServer-based storage tier of an application may limit incoming connections from a caching tier to port 1433, which is the default port for access to the storage engine, and outgoing connections to instances within a security group containing logging infrastructure using port 514, the default port for syslog. This limits access to the storage tier and may conform to a storage tier model rule (e.g., best practices). In some embodiments, the connections are limited to ports and/or protocols corresponding to one or more storage systems provided by the storage tier. A tier of an application that matches a corresponding security group model rule can be inferred to be a storage tier.

In some embodiments, the security group model rules 120 may include security models for various tier types. An application's security group rules 114 can be compared to the security models by architecture analyzer 118 (e.g., using one or more classifiers trained using security group rules for known tier types). The classifiers of a machine learning system may provide a matching tier type and a confidence level of the corresponding match. In some embodiments, a user's security settings for a tier may not match the security model rule. For example, a developer may be unaware of best practices for each tier, may misidentify tiers, or may introduce other errors. In such a case, the type of tier may be identified based on which model rule is most closely matched, based on which tier types have already been identified, etc. For example, the tier having the highest confidence match may be determined to be the type of tier.

As shown at numeral 4, placement data can be provided to a placement service 122. The placement data may include the tier types identified by architecture analyzer 118 and/or spread requirements (e.g., strict spread, maximum number of virtual machines for a tier on the same host, etc.) for each identified tier type. For example, placement service 122 can obtain one or more candidate virtualization guest locations on a plurality of hosts 104. For a given tier, the placement service 122 can use the placement data to identify candidate virtualization guest locations on hosts that already host virtual machines of a given tier. The candidate virtualization guest locations on these hosts may be removed from the candidate virtualization guest locations and the remaining virtual machines can be placed. In some embodiments, if candidate virtualization guest locations cannot be identified that meet the requirements of the placement data, the placement may be canceled. For example, if the tier is to be strictly spread, and there are insufficient virtualization guest locations for the virtual machines, the placement may be canceled. In some embodiments, the spread requirements may allow a maximum number of virtual machines to be placed on the same host. Candidate virtualization guest locations on hosts that already meet the maximum number can be removed from the candidate virtualization guest locations, and then virtual machines can be placed. In some embodiments, the candidate virtualization guest locations may be ranked based on spread prior to placement. For example, candidate virtualization guest locations on hosts that do not have a virtual machine belonging to the same tier may receive a highest ranking, candidate virtualization guest locations on hosts that include a virtual machine but do not exceed the maximum of the spread requirements can receive a score based on the number of virtual machines on the host, and candidate virtualization guest locations on hosts that cannot host a virtual machine due to the spread requirements may receive a lowest score. Once the virtualization guest locations have been selected, the virtual machines may be placed, as shown at numeral 5.

In some embodiments, as shown at numeral 6, an optional security recommendation can be provided to the user based on the architecture analysis. Based on the architecture analysis described at numeral 3, any differences between a tier's security settings and the security group model rule may indicate a less optimal security posture. For example, a storage tier that allows communication with multiple security groups may increase the opportunities that an attacker has to try to exploit the storage tier. In some embodiments, a security visualization may be provided to the user showing which entities (e.g., other networks, security groups, the internet, etc.) can communicate with a given virtual machine. The visualization may also include a visualization of a model tier of the same type having rules conforming to best practices. Suggested changes to the user-provided rules can also be provided and/or implemented automatically for the user's application.

In some embodiments, inferring architecture can be implemented as a service. A user can optionally enroll in the inferring architecture service by submitting a web service API request to provider network 100 and/or to an inferring architecture service provided by another service provider. For example, steps 2-6 shown in FIG. 1 may be provided when the user has enrolled in the service.

Figure 2:
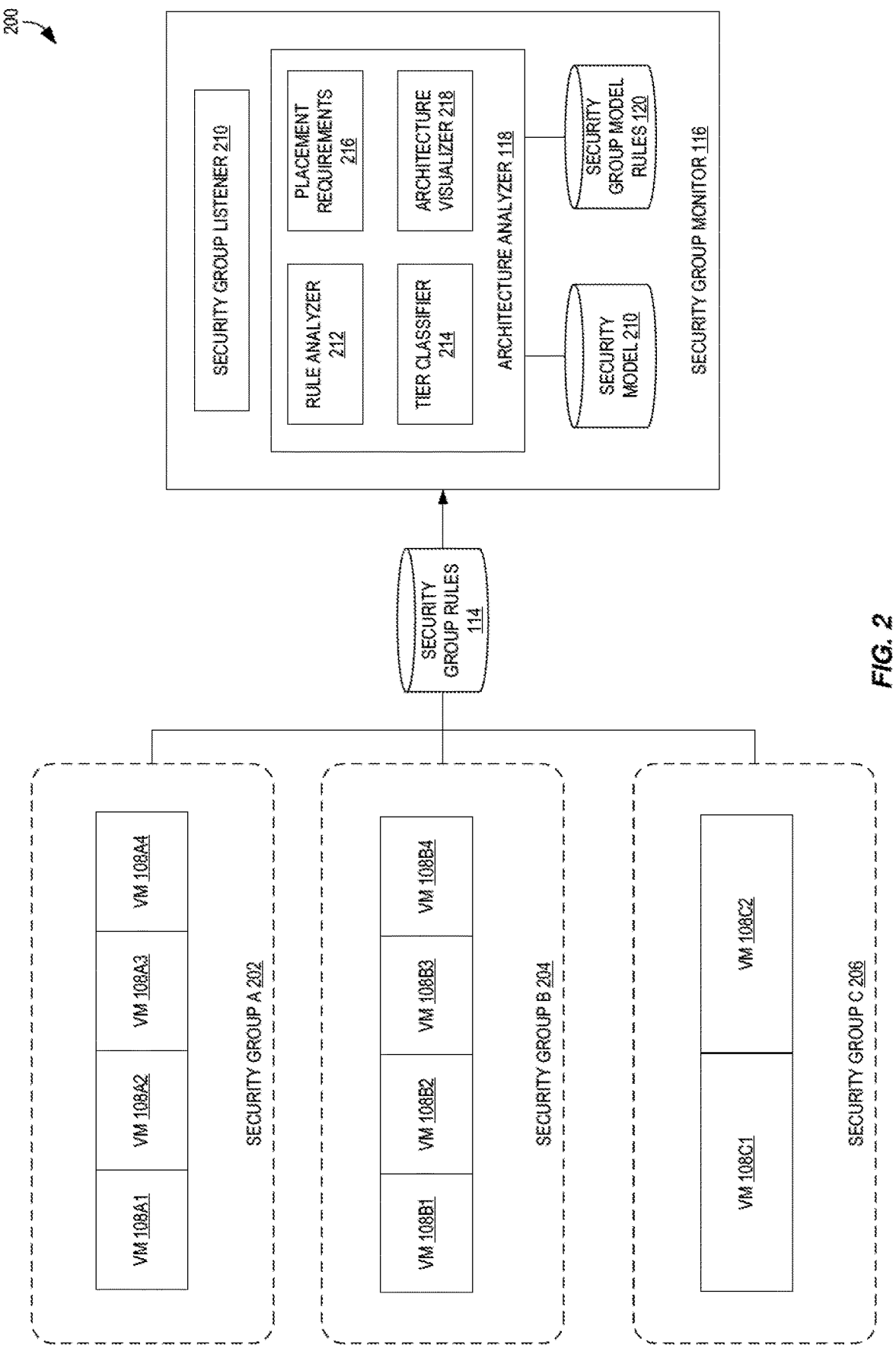
FIG. 2 is a diagram illustrating a security group monitor according to some embodiments.

FIG. 2 is a diagram 200 illustrating a security group monitor according to some embodiments. As discussed, a security group monitor 116 can ingest security group rules as they defined by users. In some embodiments, each user can define security settings through hardware virtualization service 102 or directly through security group manager 110 (e.g., through a security group user interface 112). The user may define one or more security groups using security group rules 114 and associate virtual machines with each security group. The security group rules define how the security groups may communicate and may be enforced by VMMs 106. As shown in FIG. 2, a user has defined three security groups 202-206 for their application. Security group A 202 includes four virtual machines 104A1-104A4. Security group B 204 includes four virtual machines 104B1-104B4. Security group C 206 includes two storage virtual machines 108C1 and 108C2. The storage virtual machines may include one or more virtual data stores provided by a storage virtualization service, instances of a storage server, or other storage system. The rules for these security groups are accessible to the hardware virtualization service, however the intended role for each group is not known. As discussed, security group monitor 116 may be used to infer the architecture of the user's application, including a type of each security group.

As discussed, security group rules may be enforced by VMMs 106. In some embodiments, some or all of the security group rule enforcement may be enforced by one or more offload cards (e.g., dongles). The offload cards may be enforced by the offload card or cards off-server in a router or other network device that is coupled to a control plane. For example, in some embodiments a host electronic device (e.g., operating as part of a hardware virtualization service) can host one or more compute instances, and the one or more offload cards can execute a virtualization manager that can manage compute instances that execute on the host electronic device. The offload card(s) can perform compute instance management operations including enforcement of security group rules to control communication of virtual machines in each security group. These management operations may, in some embodiments, be performed by the offload card(s) in coordination with a hypervisor (e.g., upon a request from a hypervisor) or can accommodate requests from other entities, and may not coordinate with (or service) any hypervisor.

In some embodiments, a security group listener 210 may monitor security group rules 114 for new security group rules and/or changes to existing rules. When a new rule or a changed rule is detected, the security group listener can instruct architecture analyzer 118 to request the new rule or changed rule. In some embodiments, security group rules 114 may push any new or changed rules to architecture analyzer 118 automatically as the changes are made. In some embodiments, architecture analyzer can pull changes to the rules periodically.

Architecture analyzer 118 may include a rule analyzer 212 to analyze the security group rules. Rule analyzer 212 can analyze the security group rules in view of security group model rules 120. The security group model rules may include rules based on best practices for one or more types of tiers. For example, security group model rules 120 may include one or more of an app tier model rule, a caching tier model rule, a front end tier model rule, a storage tier model rule, etc. Each tier may be associated with one or more model rules that are typically defined for that tier. The model rules may be defined like user-defined rules, including a protocol, range of ports, and source/destination. The security group rules can be scored based on how closely they match the model rules associated with a tier type. For example, a value may be assigned based on how closely the security group rules for a given security group match a tier's model rules. In a simplified case, a security group may have a single rule which allows TCP traffic over port 22 from two other security groups of the application. If the model rules for a storage tier allows TCP traffic over port 22 from one other security group, the rule analyzer may determine that two-thirds of the rule matches the model rule and a match value of 67 (out of a maximum of 100) to a storage tier is associated with the security group. Alternative weightings may also be used to determine the match value.

In some embodiments, tier classifier 214 may be used to analyze security group rules and determine which tier the security group likely belongs to. Security model 210 can include rules used by known tier types. may include security models for various tier types. Tier classifier 214 can be trained using security model 210 to determine which tier an input rule or set of input rules likely belong. The tier classifier may provide a matching tier type and a confidence level of the corresponding match. The type of tier may be identified based on which tier's model rules are most closely matched, based on which tier types have already been identified, etc. For example, the tier having the highest confidence match may be determined to be the type of tier.

Rule analyzer 212 can analyze the security group rules 114 to identify any placement requirements included in the security group rules. For example, some security groups may include spread requirements for virtual machines of the security group. The spread requirement may include a maximum number of virtual machines per host, an average number of virtual machines per host (e.g., calculated across the total number of hosts that include virtual machines assigned to a security group, or other spread requirements. The tier type corresponding to each security group (e.g., as determined by rule analyzer and/or tier classifier) and placement requirements 216 can be provided to a placement service to deploy the virtual machines. This may be performed when the application is first deployed or as new virtual machines are added to the application. For example, if 10 new virtual machines are being added to a web tier, those new virtual machines can be placed according to the placement requirements in view of the existing virtual machines that have already been deployed.

Architecture visualizer 218 can generate a visualization of the application architecture using the security group rules and the inferred tier types corresponding to the security groups. The visualization may display each tier and the rules for that tier (e.g., indicating which entities (e.g., other networks, security groups, the internet, etc.) can communicate with virtual machines of a given tier). In some embodiments, the visualization may also include a visualization of a model tier of the same type using model rules for that tier type. Differences between the model tier and the user's tier can be highlighted in the visualization indicating changes to the user's tier that can be made to conform to best practices.

Figure 3:
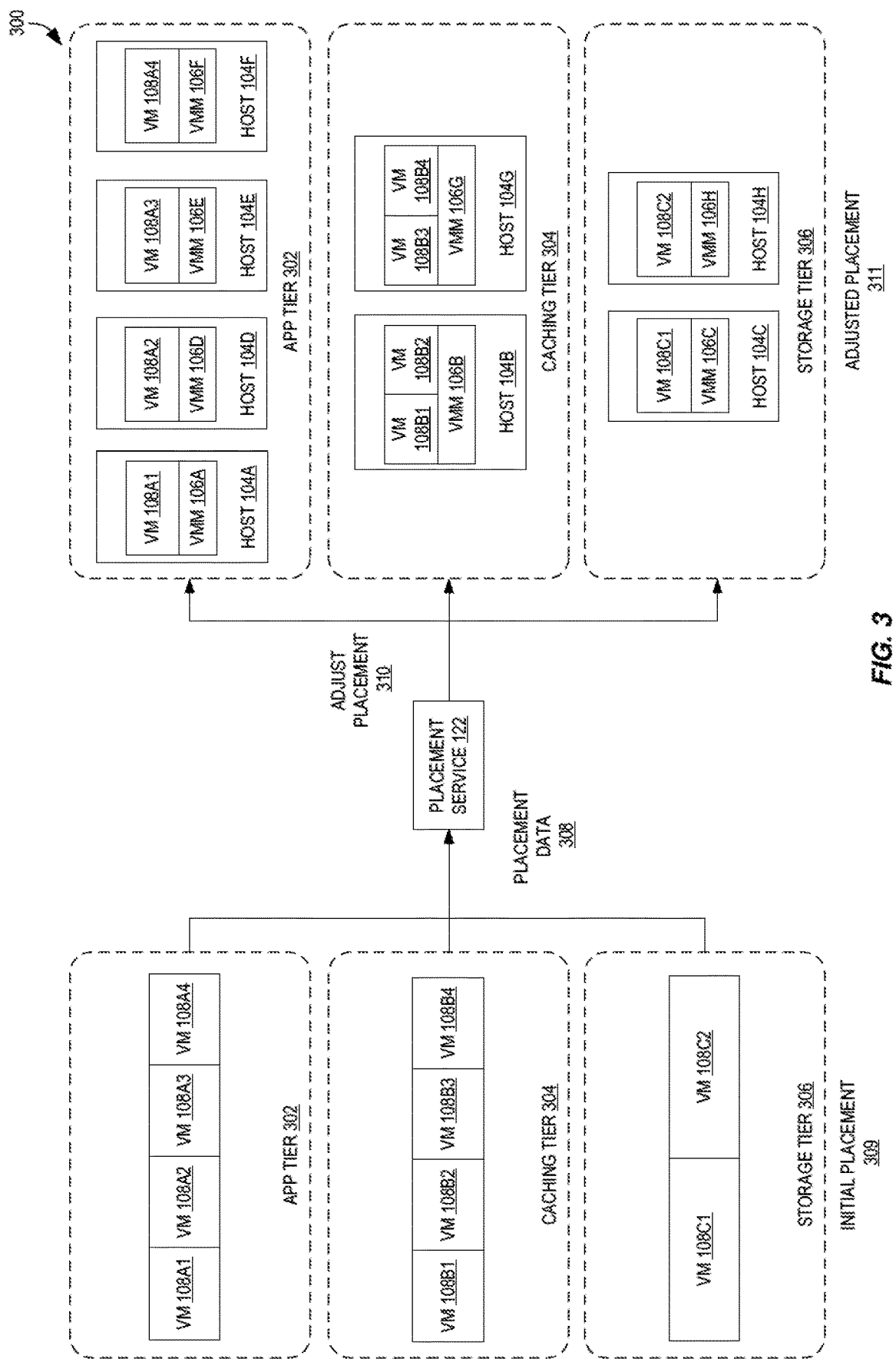
FIG. 3 is a diagram illustrating placement of virtual machines based on inferred architecture according to some embodiments.

FIG. 3 is a diagram 300 illustrating placement of virtual machines based on inferred architecture according to some embodiments. As discussed above with respect to FIG. 1, a placement service 122 can receive placement data for a user application. The placement data may include placement requirements for one or more security groups (e.g., spread requirements) and identified tier types for the one or more security groups of the user's application. Spread requirements may be provided by the user or a default requirement may be enforced for a tier type. For example, a storage tier may require strict spread for database server virtual machines, while an application or web tier may define a maximum number of virtual machines that can share the same physical machine.

As shown in FIG. 3, an architecture analyzer has identified a user's application architecture as including an app tier 302, a caching tier 304, and a storage tier 306. As discussed above, each tier can be inferred by the architecture analyzer based on the security group rules 114 defined for each tier. For example, the architecture analyzer can compare the user-defined rules to security group templates which include security settings that are common to or represent best practices for different tier types. In some embodiments, the security group templates may include security models for various tier types. An application's security group rules 114 can be identified using the security models. For example, the user-defined rules can be passed to one or more classifiers of a machine learning system trained using the security model. The classifiers of may provide a matching tier type and a confidence level of the corresponding match. In some embodiments, a user's security settings for a tier may not match the security group model rules. In that case, the tier identified as having the highest confidence match may be inferred to be the type of tier. In some embodiments, the machine learning system can be used to identify differences between the security group rules and model rules for a matching tier type. Suggested rules changes can be determined based on the identified differences.

Placement data 308 can be provided to placement service 122. The placement data may include the tier types identified by the architecture analyzer and/or spread requirements (e.g., strict spread, maximum number of virtual machines for a tier on the same host, etc.) for each identified tier type. For example, placement service 122 can obtain one or more candidate virtualization guest locations on a plurality of hosts 104. For a given tier, the placement service 122 can use the placement data to identify candidate virtualization guest locations on hosts that already host virtual machines of a given tier. The candidate virtualization guest locations on these hosts may be removed from the candidate virtualization guest locations and the virtual machines can be placed using the remaining candidate virtualization guest locations. As discussed, the candidate virtualization guest locations may be ranked based on spread prior to placement or during a placement update. Virtual machines may then be placed to the candidate virtualization guest locations starting with the highest scored virtualization guest locations.

As discussed, security settings may be defined prior to placement of virtual machines for a user's application and/or security settings may be defined or updates after the virtual machines of a user's application have been placed. For example, as discussed a user may receive a recommendation to change their security settings following analysis by the architecture analyzer. The user may then provide one or more updated security settings (e.g., to conform with best practices defined by the hardware virtualization service). When security settings are updated, the placement data 308 may also be updated to reflect the updated security settings. For example, as shown in the initial placement 309 of tiers 302-306, the placement data may have included spread requirements which divided tiers across hosts, but did not divide virtual machines across hosts. As such, the placement service 122 placed virtual machines of each tier on the same host. However, when new security settings are defined, the placement service can receive updated placement data 308 and adjust the placement of virtual machines 310, as shown in adjusted placement 311.

Like the initial placement, when placement service 122 receives the updated placement data, placement service 122 can obtain one or more candidate virtualization guest locations on a plurality of hosts 104. For example, placement service 122 can identify virtualization guest locations on hosts 104D-104H that meet updated spread requirements. These virtualization guest locations may be selected as discussed above, based on rankings of the virtualization guest locations or based on scores calculated for the virtualization guest locations. For the purposes of this example, it is assumed that hosts 104D-104H do not include any virtual machines belonging to app tier 302 (though these hosts may include other virtual machines belonging to other tiers of the user application and/or virtual machines belonging to different applications. The placement service 122 then migrate the existing virtual machines 108A2-108A4 from host 104A to hosts 104D-104F. Alternatively, new virtual machines belonging to app tier 302 can be added to hosts 104D-104F and the existing virtual machines 108A2-108A4 on host 104A can be shutdown. Similarly, new spread settings for the caching tier may limit the number of virtual machines running on any given host to two. Accordingly, the virtual machines (108B1-108B4) of the caching tier 304 have been spread across two hosts 104B and 104G. Additionally, the two storage virtual machines 108C1 and 108C2 of storage tier 306 have been spread across two hosts 104C and 104H in the storage tier in the adjusted placement 311, achieving strict spread of the storage virtual machines. Although the example shown in FIG. 3 illustrates spreading virtual machines across multiple host machines, similar techniques may be used to spread virtual machines across any fault container (e.g., rack, data center, etc.).

FIG. 4 is an example 400 of security group rules according to some embodiments. As discussed, security settings (e.g., security group rules) can define inbound traffic rules and outbound traffic rules that control how virtual machines assigned to a given tier may communicate. Users can define the security settings for tiers in their applications. Security settings may be defined by the user at setup and/or may be dynamically added while the application is running. In some embodiments, security settings by default (e.g., without user provided definitions) may allow all traffic. In some embodiments, the security settings may be defined permissively, where the rules grant access, rather than denying access, or vice versa. Security settings may also allow inbound responses to outbound traffic from the virtual machine.

In some embodiments, when a new virtual machine belonging to a security group is to be deployed, the one or more virtual machines already deployed for that security group may be analyzed and redeployed if an improved spread across host machines is identified. Using the adjusted placement 310 of the caching tier 304 as an example, if a new caching virtual machine is to be added to the caching tier, the placement of caching virtual machines 108B1-108B4 can be reevaluated. For example, additional host machines 104 may now have available virtualization guest locations, or new hosts may have been added to the fleet of available host machines. When the new virtual machine is to be placed, the placement service may determine the number of virtual machines currently deployed belonging to the caching tier and the number of new virtual machines to be deployed. The placement service can use the placement data, as discussed above, to identify a corresponding number of candidate virtualization guest locations across the fleet of available hosts. The guest locations can be ranked and the virtual machines can be deployed/redeployed based on the new rankings. This may result in all or some of the previously deployed virtual machines to be redeployed to different hosts.

As shown in FIG. 4, incoming rules 404 and outgoing rules 406 can be defined by specifying a protocol type 408, port range 410, source 412, and destination 414. Protocol 408 may include various protocols, such as TCP, UDP, ICMP, a custom protocol or other protocols. The port range 410, can include one or more port numbers or range of numbers that are allowed. Source 412 and Destination 414 can include a specific address or a reference to another security group. For example, as shown at 416, a rule defines that TCP communications may be received at port 22 from a specific address and the rule at 418 allows TCP communications at port 80 from any source address (e.g., where 0.0.0.0/0 represents all source addresses). The rule at 420 defines that TCP communications at port 1433 from virtual machines assigned to the storage tier may be received. In this example, rule 420 can indicate the storage tier using a security group identifier for the security group corresponding to the storage tier.

Similar to incoming rules 404, outgoing rules 406 may also be defined by protocol type 408, port range 410, and destination 414. The rule at 422 allows any outgoing traffic to any destination. Alternatively, a rule may be defined to limit outgoing traffic, such as the rule shown at 424, which limits traffic to virtual machines assigned to the storage tier. In some embodiments, a user can provide a description of the rules (e.g., to identify the rule later). When the source 412 or destination 414 for a rule is defined with reference to a security group, the rule affects all virtual machines associated with that security group. For example, communications from or to the IP addresses associated with the virtual machines of the security group are allowed. For example, by defining the source as "storage tier" at 420 any virtual machines assigned to the storage tier are granted access, provided their communications comply with the other requirements of the rule.

The rules shown in FIG. 4 may represent rules for a single tier of the user's application. Incoming and outgoing rules may be likewise defined for each tier of the user's application. As discussed, the rules may vary from one tier to another and the differences in these rules between groups may be used to infer the user's application architecture. For example, these rules may be compared to those of a security group model rule or security group model to identify a matching tier. The templates may include best practices security settings for each tier. Security group model rules may include rules for typical protocol types, ranges of ports, and/or references to other tiers as the source and/or definitions. Additionally, or alternatively, an application's security group rules can be compared to the security models using one or more classifiers trained using security group rules for known tier types. The classifiers of a machine learning system may provide a matching tier type and a confidence level of the corresponding match and the tier having the highest confidence match may be determined to be the type of tier. In some embodiments, one or more classifiers can be used to identify differences between the security group rules and model rules for a matching tier type.

Figure 5:
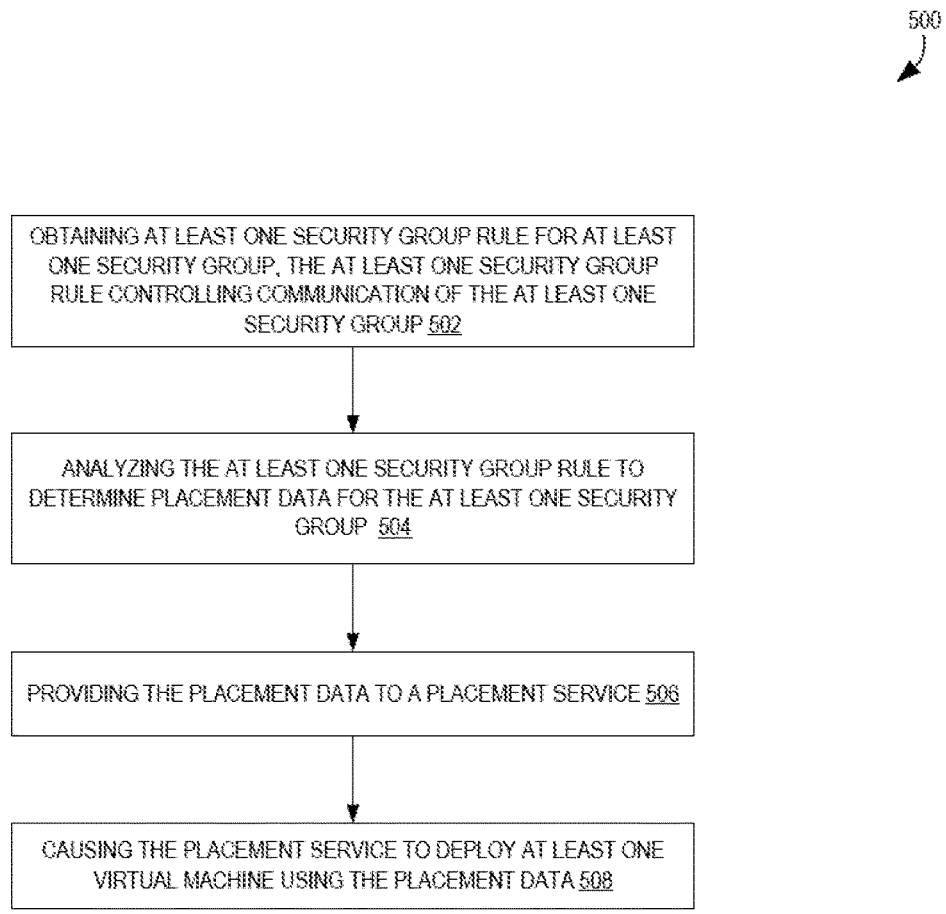
FIG. 5 is a flow diagram illustrating operations for deriving system architecture from security group relationships according to some embodiments.

FIG. 5 is a flow diagram 500 illustrating operations for deriving system architecture from security group relationships according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the security group monitor or placement service of the other figures.

The operations 500 include, at block 502, obtaining at least one security group rule for at least one security group, the at least one security group rule controlling communication of the at least one security group. In some embodiments, a security group monitor can monitor a security group rules data store including a plurality of security group rules corresponding to at least one security group in a customer application. As discussed, the plurality of security group rules enable communication with the at least one security group. For example, the security group monitor may request all or some of the rules stored in the data store when a change is detected, or the data store may be configured to push updates to the rules to the security group monitor. As discussed, a security group rule includes at least a protocol, port range, and source or destination.

The operations 500 include, at block 504, analyzing the at least one security group rule to determine placement data for the at least one security group. As discussed, the placement data can include a tier type (web tier, storage tier, caching tier, etc.) for each of the one or more security groups. In some embodiments, this analysis can include obtaining one or more security group templates, each of the one or more security group templates including model rules for a different tier type. The security monitor can compare the at least one security group rule to the one or more security group templates and determine a score for the at least one security group rule for each of the one or more security group templates. The at least one security group can then be labeled with a tier type corresponding to a security group model rule or rules having a highest score.

In some embodiments, comparing the at least one security group rule to the one or more security group templates can include determining at least one difference between the at least one security group rule and the security group model rule having the highest score and determining a rule change to the at least one security group rule based on the at least one difference. A message may be sent to a user including a suggested rule change.

In some embodiments, tier type classifiers can be used to analyze the security group rules. For example, the one or more security group rules can be provided to a tier type classifier, the tier type classifier trained using a security model including a plurality of rules defined for a plurality of known tier types. The tier type classifier can return the tier type and a confidence value from the tier type classifier, wherein the placement data includes the tier type and the confidence value.

In some embodiments, a user-defined spread requirement for virtual machines belonging to the at least one security group can be identified from the at least one security group rule (e.g., a rule may include an additional field indicating the spread requirement or including a pointer to the spread requirement elsewhere in memory).

The operations 500 include, at block 506, providing the placement data to a placement service. For example, a request can be sent to a placement service to place at least one virtual machine belonging to the tier of the customer application, the request including the type of tier corresponding to the matching security group model rules and spread requirements associated with the type of tier.

The operations 500 include, at block 508, causing the placement service to deploy at least one virtual machine using the placement data. In some embodiments, the placement service identifies at least one candidate virtualization guest location based on the type of tier and the spread requirements and deploys the at least one virtual machine to the candidate virtualization guest location. The placement service can determine a rank for each of the plurality of candidate virtualization guest locations based on the placement data and deploy the plurality of virtual machines to the plurality of candidate virtualization guest locations using each candidate virtualization guest location's rank. In some embodiments, after the application has been deployed additional virtual machines can be added to a given security group and may be placed based on the placement data and further based on where the previously deployed virtual machines are located (e.g., new virtual machines can be spread away from preexisting virtual machines).

Figure 6:
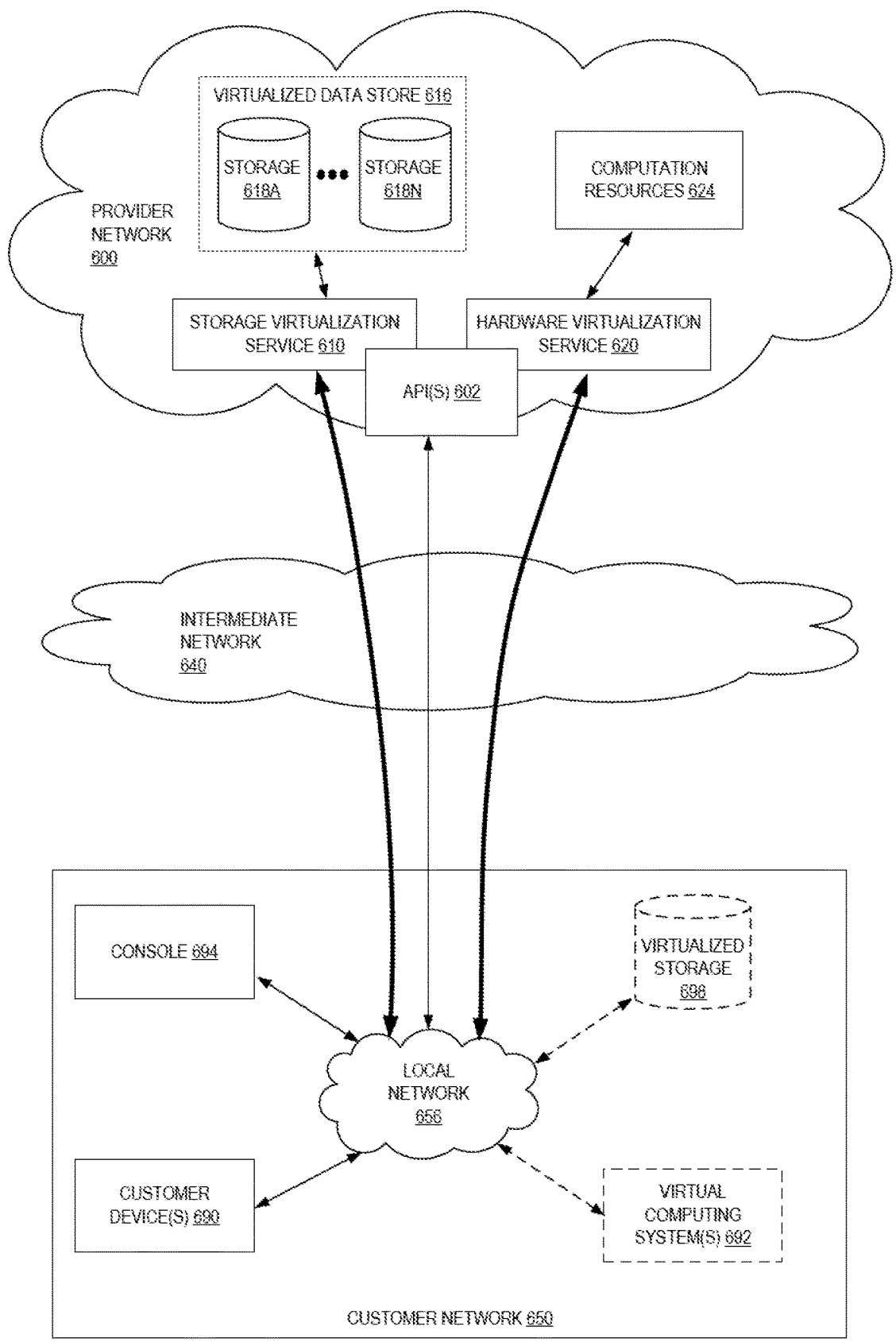
FIG. 6 is a block diagram of an example provider network that provides a storage virtualization service and a hardware virtualization service to customers according to some embodiments.

In some embodiments, the security group monitor can generate a visualization of the tier of the customer application, the visualization including one or more computing systems with which the tier of the customer application can communicate based on the set of security group rules. In some embodiments, the visualization FIG. 6 is a block diagram of an example provider network that provides a storage virtualization service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694. In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 or console 694, the customer may access the functionality of storage virtualization service 610, for example via one or more APIs 602, to access data from and store data to a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Figure 7:
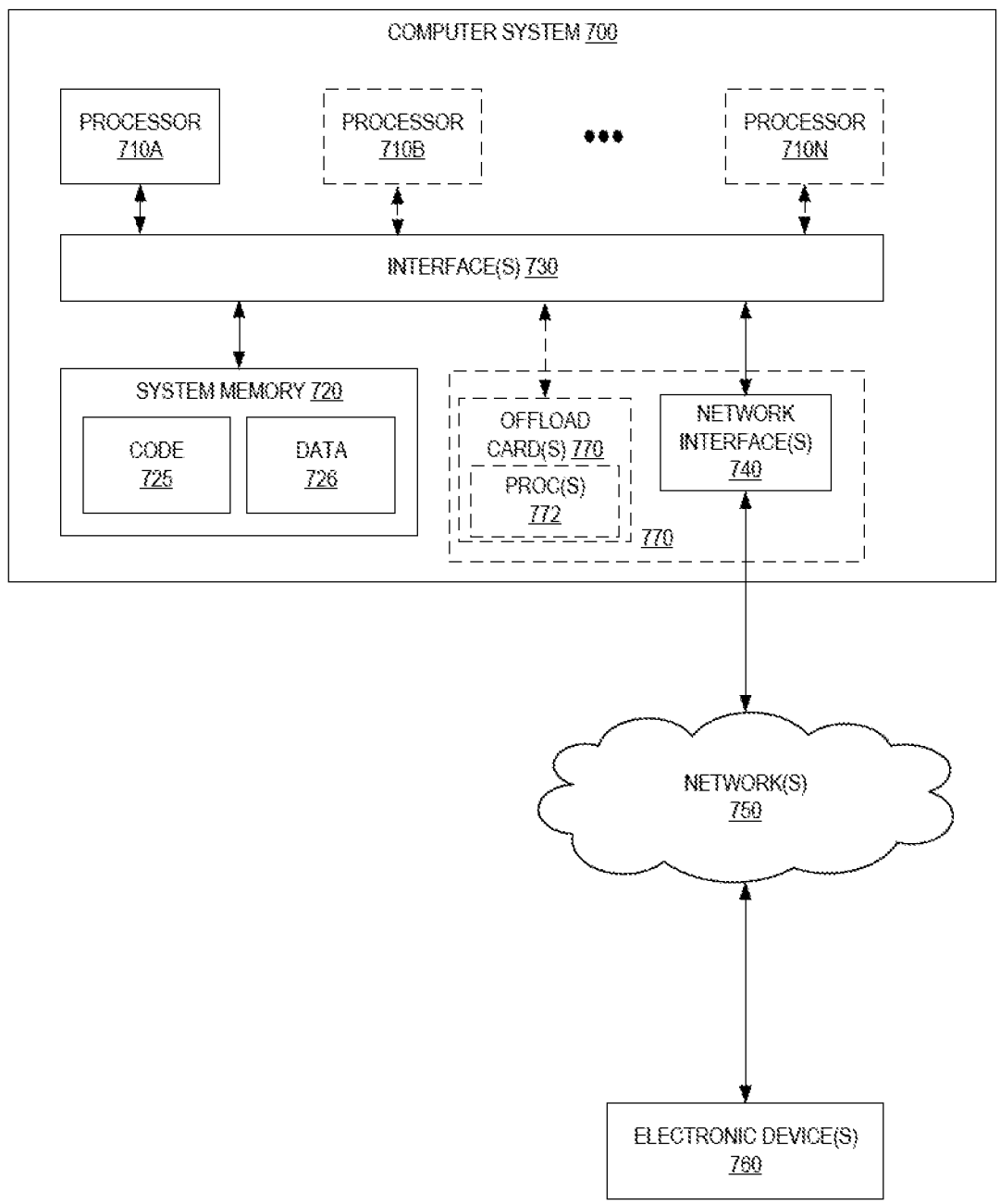
FIG. 7 is a block diagram illustrating an example computer system that may be used in some embodiments.

In some embodiments, a system that implements a portion or all of the techniques for deriving system architecture from security group relationships as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities, and may not coordinate with (or service) any hypervisor.

In some embodiments, system memory 720 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A computer-implemented method comprising:
obtaining at least one security group rule for at least one security group, the at least one security group rule controlling incoming or outgoing network communication of a set one of one or more virtual machines in the at least one security group;
analyzing the at least one security group rule to determine placement data for the at least one security group; wherein the placement data comprises a tier type and a confidence value;
wherein analyzing the at least one security group rule to determine the placement data for the at least one security group is based on: providing the at least one security group rule to a trained tier type classifier, and receiving the tier type and the confidence value from the trained tier type classifier; wherein a machine learning classifier model is trained to infer the tier type for the at least one security group based on a security model including a plurality of rules defined for a plurality of known tier types to yield the trained tier type classifier;
providing the placement data to a placement service; and
causing the placement service to deploy at least one virtual machine using at least the tier type inferred for the at least one security group.

2. The computer-implemented method of claim 1 wherein analyzing the at least one security group rule to determine the placement data for the at least one security group is based on:
comparing the at least one security group rule to one or more security group model rules;
determining a score for the at least one security group rule for each of the one or more security group model rules; and
labelling the at least one security group with a tier type corresponding to at least one security group model rule having a highest score.

3. The computer-implemented method of claim 2 wherein comparing the at least one security group rule to the one or more security group model rules is based on:
determining at least one difference between the at least one security group rule and the at least one security group model rule having the highest score; and
determining a suggested rule change to the at least one security group rule based on the at least one difference for a user associated with the at least one security group rule.

4. The computer-implemented method of claim 1 wherein analyzing the at least one security group rule to determine the placement data for the at least one security group is based on:
identifying a spread requirement for virtual machines belonging to the at least one security group from the at least one security group rule.

5. The computer-implemented method of claim 1 wherein the placement service:
receives a request to place a plurality of virtual machines belonging to a first security group;
determines a rank for each of a plurality of candidate virtualization guest locations based on the placement data; and
deploys the plurality of virtual machines to the plurality of candidate virtualization guest locations based at least on their ranks.

6. The computer-implemented method of claim 5 wherein the placement service:
receives a request to place at least one virtual machine belonging to the first security group;
determines a rank for each of a second plurality of candidate virtualization guest locations based at least on the placement data and placement of the plurality of virtual machines;
deploys the at least one virtual machine to at least one candidate virtualization guest locations based at least on their ranks; and
redeploys at least one of the plurality of virtual machines to the second plurality of candidate virtualization guest locations based at least on their ranks.

7. The computer-implemented method of claim 1 wherein the at least one security group rule includes a protocol, port range, and source or destination identifier.

8. The computer-implemented method of claim 1, further comprising:
generating a first visualization of a tier of an application corresponding to the at least one security group, the first visualization including one or more computing systems with which the tier of the application can communicate based on the at least one security group rule.

9. The computer-implemented method of claim 1, wherein the tier type inferred for the at least one security group is selected from the group consisting of application tier, storage tier, and caching tier.

10. A system comprising:
a first one or more electronic devices comprising one or more hardware processors to implement a placement service in a multi-tenant provider network; and
a second one or more electronic devices comprising one or more hardware processors to implement security group monitor in the multi-tenant provider network, the security group monitor including instructions that upon execution cause the security group monitor to:
obtain at least one security group rule for at least one security group, the at least one security group rule controlling incoming or outgoing network communication of a set one of one or more virtual machines in the at least one security group;
analyze the at least one security group rule to determine placement data for the at least one security group; wherein the placement data comprises a tier type and a confidence value;
wherein the instructions that upon execution cause the security group monitor to analyze the at least one security group rule to determine the placement data for the at least one security group comprise instructions that upon execution cause the security group monitor to provide the at least one security group rule to a trained tier type classifier, and receive the tier type and the confidence value from the trained tier type classifier; wherein a machine learning classifier model is trained to infer the tier type for the at least one security group based on a security model including a plurality of rules defined for a plurality of known tier types to yield the trained tier type classifier;
provide the placement data to the placement service; and cause the placement service to deploy at least one virtual machine using at least the tier type inferred for the at least one security group.

11. The system of claim 10 wherein the instructions to analyze the at least one security group rule to determine the placement data for the at least one security group, when executed, further cause the security group monitor to:
  compare the at least one security group rule to one or more security group model rules;
  determine a score for the at least one security group rule for each of the one or more security group model rules; and
  label the at least one security group with a tier type corresponding to at least one security group model rule having a highest score.

12. The system of claim 11 wherein the instructions to compare the at least one security group rule to the one or more security group model rules, when executed, further cause the security group monitor to:
  determine at least one difference between the at least one security group rule and the at least one security group model rule having the highest score; and
  determine a suggested rule change to the at least one security group rule based on the at least one difference for a user associated with the at least one security group rule.

13. The system of claim 10 wherein the instructions to analyze the at least one security group rule to determine the placement data for the at least one security group, when executed, further cause the security group monitor to:
  identify a spread requirement for virtual machines belonging to the at least one security group from the at least one security group rule.

14. The system of claim 10 wherein the placement service comprises instructions that upon execution cause the placement service to:
  receive a request to place a plurality of virtual machines belonging to a first security group;
  determine a rank for each of a plurality of candidate virtualization guest locations based on the placement data; and
  deploy the plurality of virtual machines to the plurality of candidate virtualization guest locations based at least on their ranks.

15. The system of claim 14 wherein the placement service comprises instructions that upon execution further cause the placement service to:
  receive a request to place at least one virtual machine belonging to the first security group;
  determine a rank for each of a second plurality of candidate virtualization guest locations based at least on the placement data and placement of the plurality of virtual machines;
  deploy the at least one virtual machine to at least one candidate virtualization guest location based at least on its rank; and
  redeploy at least one of the plurality of virtual machines to the second plurality of candidate virtualization guest locations based at least on their ranks.

16. The system of claim 10 wherein the at least one security group rule includes a protocol, port range, and source or destination identifier.

17. The system of claim 10, wherein the instructions, upon execution, further cause the security group monitor to:
  generate a first visualization of a tier of an application corresponding to the at least one security group, the first visualization including one or more computing systems with which the tier of the application can communicate based on the at least one security group rule.

18. The system of claim 10, wherein the tier type inferred for the at least one security group is selected from the group consisting of application tier, storage tier, and caching tier.

* * * * *